Patented Sept. 19, 1933

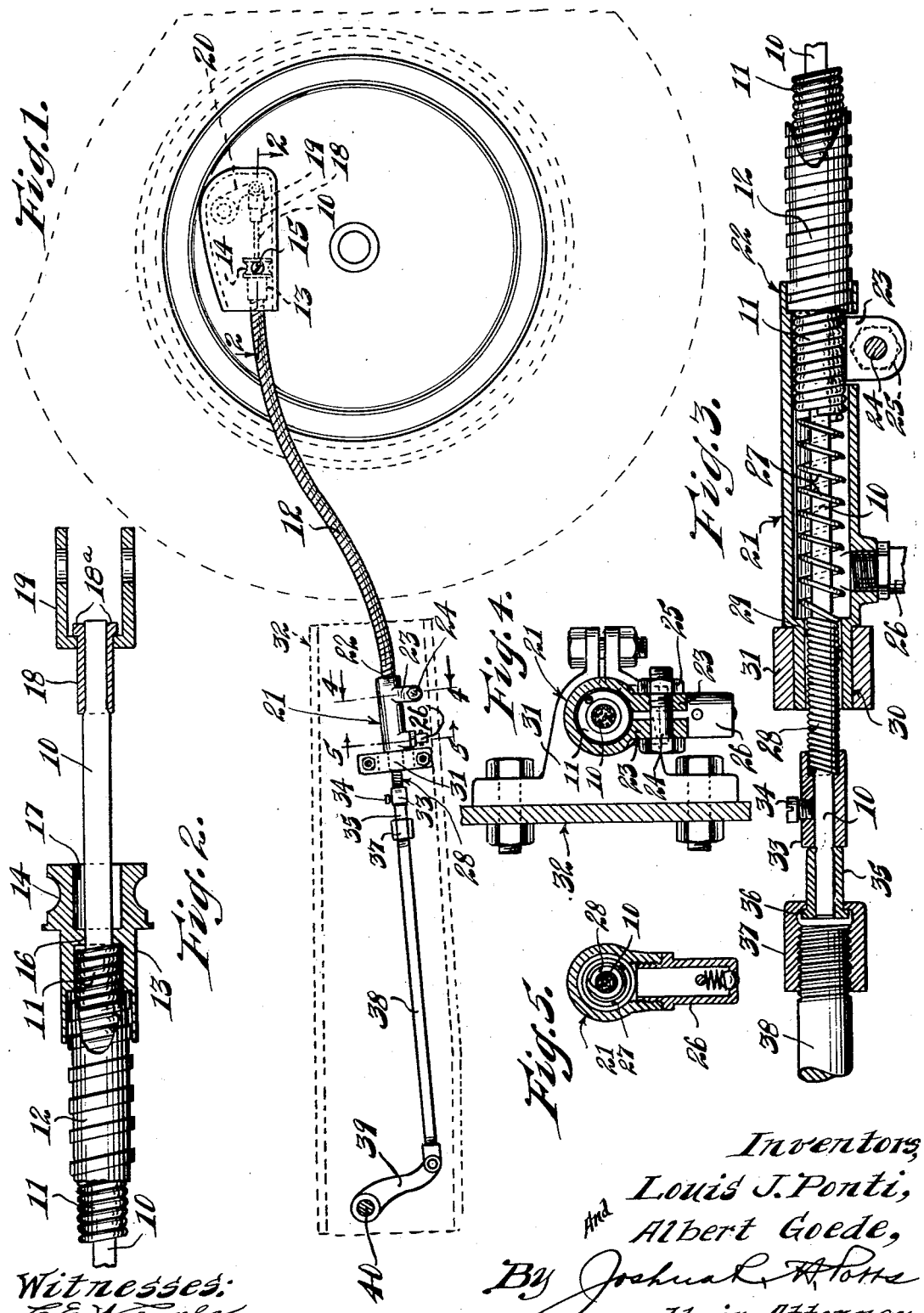

1,927,615

UNITED STATES PATENT OFFICE 1,927,615

BRAKE CABLE

Louis J. Ponti and Albert Goede, Chicago, Ill.

Application December 1, 1932. Serial No. 645,259

4 Claims. (Cl. 74—39)

This invention relates to improvements in brake cables, and an object of the invention is the provision of a cable which will be amply protected from dirt and moisture, will be easily lubricated, and consequently will be kept in the best working condition at all times. A further object of the invention is the provision of means for adjusting the cable, that is, making proper adjustment for the stretching to which the cable is subject. Another object is the provision of novel means for assisting the release of the brakeshoes from the brake drum.

Other objects will appear hereinafter.

The invention consists in the combinations and arrangements of parts hereinafter described and claimed.

The invention will be best understood by reference to the accompanying drawing, forming a part of this specification, and in which:

Fig. 1 is a side elevational view showing our brake cable attached to a car frame, brake rod, and brake drum housing;

Fig. 2 is a detail view, partially in section, taken substantially on the line 2—2 of Fig. 1;

Fig. 3 is a detail view, with parts in section;

Fig. 4 is a sectional view taken substantially on the line 4—4 of Fig. 1; and

Fig. 5 is a sectional view taken substantially on the line 5—5 of Fig. 1.

The preferred embodiment of our invention illustrated comprises a cable 10 sheathed in a flexible spring housing member 11 which is in turn encased by flexible telescoping housing 12. Cable 10 slides through collar 13, and collar 13 is crimped about spring housing 11 and telescoping housing 12. Adjacent one end of collar 13 is provided an annular groove 14 which is adapted to receive a set screw 15 or other suitable means of attachment at a point adjacent the brake lever and shaft of the wheel. Intermediate the ends of collar 13 is provided a restricted passage 16 to serve as a guide for cable 10. Adjacent one end of collar 13 is an enlarged bore 17 for the purpose of receiving band 18 which is crimped to cable 10 and is provided adjacent one end thereof with a shoulder 18ª which is adapted to hold yoke 19 and permit the same to swivel on band 18. Yoke 19 is pivotally secured to brake lever 20 for the purpose of causing the setting of the brakes.

Intermediate the ends of cable 10 and distant from the collar 13 an elongated sleeve 21 may be provided to receive housings 11 and 12. Housing 12 may be crimped by the sleeve 21, as at 22, and the housing 11 may be clamped by the split portions 23 which are extended outwardly from sleeve 21 and receive bolt 24 which receives nut 25 by threaded engagement therewith. Sleeve 21 may be provided with a suitable oil cup 26 for lubricating the parts interiorly of said sleeve 21. A spring 27 having a portion 28 of reduced size may be provided interior of sleeve 21 and made to abut spring housing 11. The reduced portion of spring 27 may be made to pass through restricted portion 29 of sleeve 21, and said portion 29 serves as a guide for sliding movement of portion 28; reduced portion 29 also provides a shoulder for spring 27 to seat against.

The exterior portion 30 of restricted portion 29 may serve as an anchoring set for the sleeve which may be secured by a clamping bracket 31, which is in turn bolted to frame member 32. Exterior of sleeve 21 a sleeve 33 may be crimped around spring portion 28, and through sleeve 33 may be passed set screw 34 for securely affixing said sleeve to cable 10. A band 35 having a shoulder 36 may be crimped on cable 10, and threaded cap 37 may be swiveled thereto. Cap 37 may be threadedly attached to brake rod 38 which is pivotally secured to brake lever 39. Power for the movement of brake lever 39 may be obtained from brake shaft 40.

In cables of the character herein described and used in the braking systems of automobiles, there is a tendency for the cables to become stretched over a long period of use, and consequently in order to insure the utmost efficiency of the brakes, it is desirable to compensate for this stretching which has occurred. We have provided for this compensation by the above described arrangements and parts, and their operation for this purpose may briefly be described as follows: Nut 25 may be loosened on bolt 24 and the clamping portions 23 thus released from spring housing 11. Flexible housing 12 may then be grasped and pulled upwardly as in Fig. 1 so as to pull spring housing 11 outwardly from sleeve 21, and then with the housings 11 and 12 in this position nut 25 should be tightened. It can be seen that this action will cause flexible housing 11 to bow to a greater extent between sleeve 21 and collar 13. Because of the curved path which the cable must then follow, its additional length will be taken up and the pulling action between brake rod 38 and brake lever 20 will thus be restored to normal. In order to assist this action, if necessary, set screw 34 may be loosened and sleeve 33 pushed toward sleeve 21 and thus cause spring 27 to be compressed and push housing 11 outwardly from sleeve 21. After clamping nut 25 has been tightened, sleeve 33 may be released and the action of spring 27 will restore it to the position shown in Fig. 3; set screw 34 may then be retightened.

Additional adjustment may be made by loosening clamping bracket 31 and sliding reduced portion 30 to the right as shown in Fig. 1. In order to facilitate a great range of adjustment, reduced portion 30 may be lengthened and spring portion 28 also lengthened to an appropriate degree. After the movement of portion 30 to the right as explained clamping bracket 31 may be again tightened so as to prevent any longitudinal movement. It can be seen that the adjustment just described will likewise cause housings 11 and 12 to bow and make the path of travel of cable 10 of greater length; the stretch of the cable will thus be compensated for by this adjustment.

It can be seen from an inspection of Fig. 3 that when rod 38 is moved toward the left it will pull cable 10 and sleeve 33, and because sleeve 33 is crimped around spring portion 28, said portion will be stretched. When the tension on rod 38 is released spring portion 28, being under tension, will tend to pull sleeve 33 and cable 10 back to their original positions. This continual motion of the convolutions of spring portion 28 will tend to keep foreign substance from entering the interior of sleeve 21, and when grease is applied under pressure to grease cup 26 the action of said grease will tend to expel any dirt or foreign substance from the interior of sleeve 21.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to secure by Letters Patent is:

1. In braking mechanism, a cable, a flexible housing surrounding said cable, a sleeve surrounding said cable and adapted to embrace said flexible housing, means for securing said sleeve to said housing member, and a resilient member within said sleeve member and surrounding said cable, said resilient member having a portion protruding from said sleeve, said resilient member being adapted to abut against said flexible housing member and urge same outwardly from said sleeve member.

2. In braking mechanism, a cable, a flexible housing member surrounding said cable, a sleeve member surrounding said housing and adapted to clampingly receive said housing member, a resilient member within said sleeve, and a restricted portion within said sleeve, said resilient member being adapted to seat against said restricted portion and abut against said flexible housing member.

3. In braking mechanism, a cable, a flexible housing member surrounding said cable, a sleeve member surrounding said housing and adapted to clampingly receive said housing member, a reduced portion carried by said sleeve, and a resilient member within said sleeve and provided with a reduced portion adapted to protrude from said sleeve and be embraced by said reduced portion of said sleeve.

4. In braking mechanism, a cable, a flexible housing member surrounding said cable, a sleeve member surrounding said housing and adapted to clampingly receive said housing member, a reduced portion carried by said sleeve, a resilient member within said sleeve and provided with a reduced portion adapted to protrude from said sleeve and be embraced by said reduced portion of said sleeve, and a band secured to said reduced portion of said resilient member and to said cable.

LOUIS J. PONTI.
ALBERT GOEDE.